United States Patent
Toy

(10) Patent No.: US 10,318,335 B1
(45) Date of Patent: Jun. 11, 2019

(54) SELF-MANAGED VIRTUAL NETWORKS AND SERVICES

(71) Applicant: Verizon Patent and Licensing Inc., Arlington, VA (US)

(72) Inventor: Mehmet Toy, Allendale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 30 days.

(21) Appl. No.: 15/820,643

(22) Filed: Nov. 22, 2017

(51) Int. Cl.
*G06F 9/44* (2018.01)
*G06F 9/455* (2018.01)
*G06F 11/07* (2006.01)
*G06N 5/02* (2006.01)

(52) U.S. Cl.
CPC ...... *G06F 9/45558* (2013.01); *G06F 11/0712* (2013.01); *G06F 11/0793* (2013.01); *G06N 5/022* (2013.01); *G06F 2009/45591* (2013.01); *G06F 2009/45595* (2013.01)

(58) Field of Classification Search
CPC ........................................................ G06F 9/44
USPC ............................................................ 718/1
See application file for complete search history.

(56) References Cited

U.S. PATENT DOCUMENTS

| | | | | |
|---|---|---|---|---|
| 9,317,222 | B1* | 4/2016 | Yueh | G06F 3/067 |
| 9,367,453 | B1* | 6/2016 | Clark | G06F 12/08 |
| 9,497,039 | B2* | 11/2016 | Greenberg | H04L 12/4633 |
| 2007/0242604 | A1* | 10/2007 | Takase | H04J 3/14 370/223 |
| 2016/0140515 | A1* | 5/2016 | Katsumata | G05B 19/418 705/7.25 |
| 2016/0352578 | A1* | 12/2016 | Chen | H04L 41/12 |

OTHER PUBLICATIONS

Toy, Mehmet, "Architectural Framework for Self-Managed Networks with Fault Management Hierarchy," Comcast, Internet Engineering Task Force, Jun. 29, 2015, 17 pages.
Toy, Mehmet, "Self-Managed Networks with Fault Management Hierarchy," Comcast, Mar. 2015, 43 pages.

\* cited by examiner

*Primary Examiner* — Jae U Jeon

(57) ABSTRACT

Systems and methods described herein include high-availability layers for virtualized systems and services. Virtual network elements include an infrastructure layer that automatically detects and repairs failures in hardware and an operating system for one of the virtual network elements; a virtualization layer that automatically detects and repairs failures in a hypervisor executing on the hardware and the operating system; a virtual machine layer that automatically detects and repairs failures in virtual machines managed by the hypervisor; a virtual network function layer that automatically detects and repairs failures in virtual network functions executed on the virtual machines; and a connection layer that automatically detects and repairs failures in connections between the virtual network elements. Each layer includes a fix agent, which uses artificial intelligence rules to automatically provide an estimated fix time interval for a local failure and to repair the local failure, and a fault management agent, which diagnoses failures within the corresponding layer.

19 Claims, 16 Drawing Sheets

SELF-MANAGED VIRTUAL NETWORKS AND SERVICES

BACKGROUND

High availability is necessary for virtualized systems and services to minimize down time. To meet user expectation, the availability of virtualized systems and services should be on par with that of non-virtualized systems and services. However, high-availability designs for virtualized systems and services are much more complicated than their non-virtualized counterparts due to the existence of independent multiple layers where each layer may have its own failure recovery mechanism.

DETAILED DESCRIPTION OF THE PREFERRED EMBODIMENTS

The following detailed description refers to the accompanying drawings. The same reference numbers in different drawings may identify the same or similar elements.

High availability designs seek to provide near 100 percent operation time for systems and/or services. High availability designs that are focused on one or two layers such as only applications, servers, or their combinations are inadequate in addressing high availability of virtualized systems and services. To be fully effective, high availability designs need to address all layers, end-to-end service level, and coordination among layers. Implementations herein provide self-managed networks for self-configurations, with coordinate self-diagnosis and self-repair of network problems to achieve high availability.

Self-managed applications (e.g., referred to as virtual network functions (VNFs)) provide for self-configuration, self-diagnosis of application problems, and self-repair, when possible. Furthermore, a centralized and distributed management architecture with artificial intelligence and analytics modules (referred to herein as an "orchestrator") may assist virtualized network elements (vNEs) and VNFs with self-configuration and repair of problems. The orchestrator may also predict future demands and make suggestions for networks and applications.

Implementations described herein define high-availability layers for virtualized systems and services, and associated failure recovery timers. According to one implementation, in-band communications may be used to report failures identified by vNEs, VNFs, orchestrator(s), and field technicians to all related parties. A standardized message format may be used to communicate failures, failure types, estimated fix times, and actual fixes among different devices and layers. Conditions for the relationships among the failure recovery timers are provided to ensure that the failure recoveries of one or more layers are self-coordinated and there are no race conditions among layers. Race conditions may lead to incomplete switchover and fluctuations (i.e., switching back and forth between primary and secondary units) within a system or network.

Figure 1A:
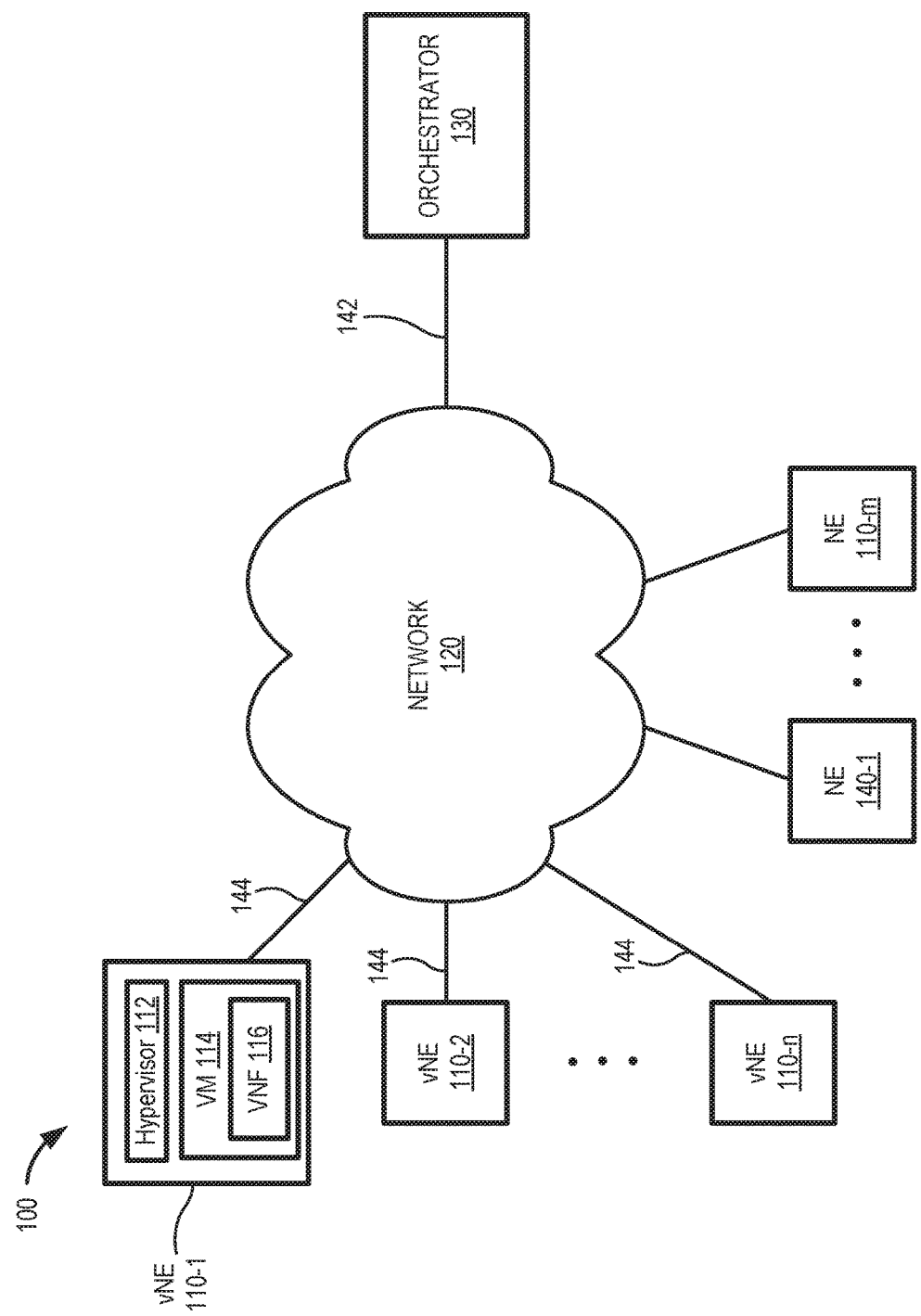
FIGS. 1A and 1B are diagrams illustrating environments where systems and methods described herein may be implemented.
Figure 1B:
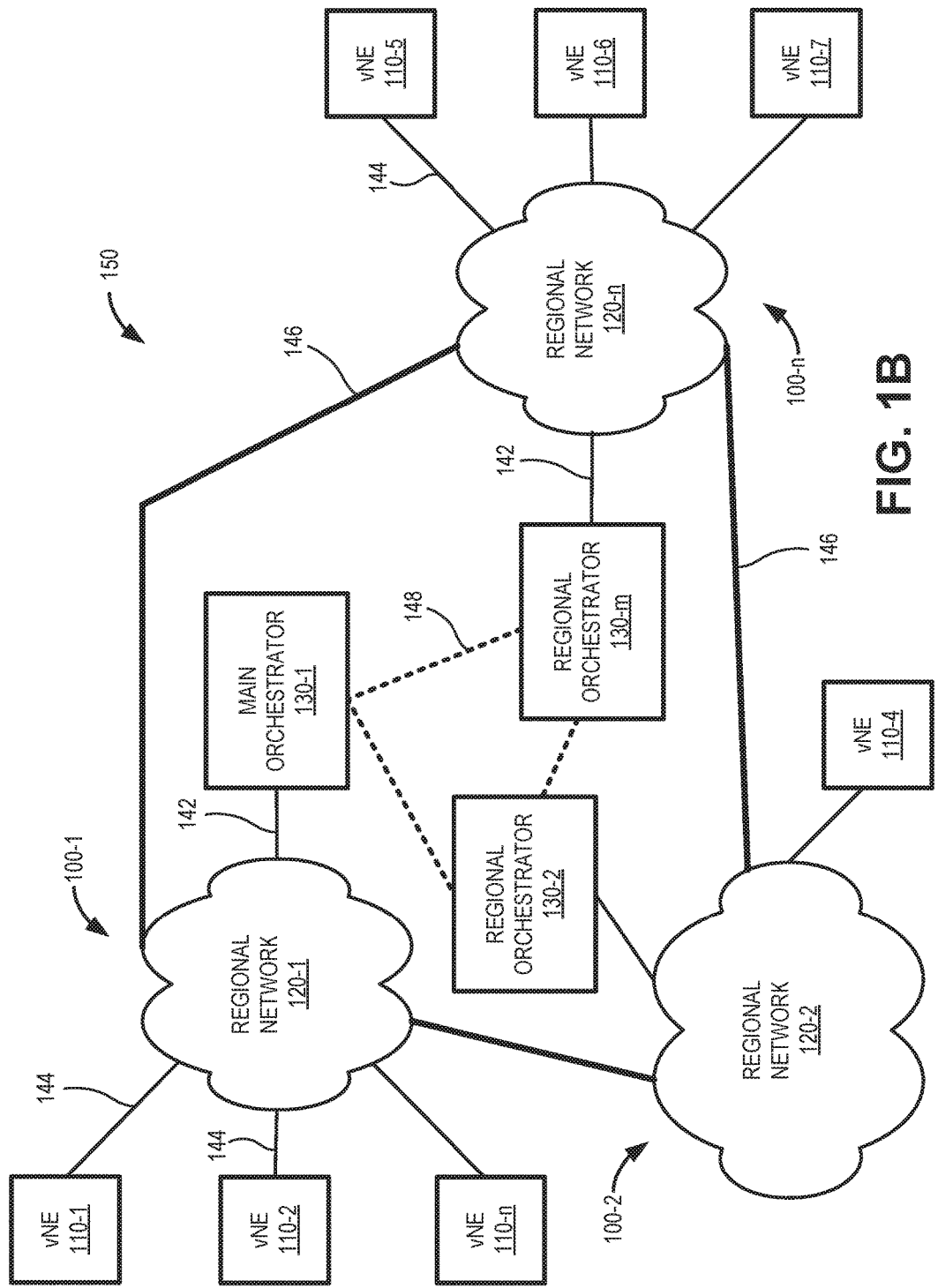

FIG. 1A is a diagram of a network environment 100 for centralized self-managed networks and services. FIG. 1B is a diagram of a network environment 150 for distributed self-managed virtual networks and services. In network 100 of FIG. 1A, self-managed virtual network elements (vNEs) 110-1 through 110-n (referred to generically as vNE 110) connect via a self-managed network 120 to an orchestrator device 130. According to another implementation, network 100 may also include physical network elements (NEs) 140-1 through 140-m (referred to generically as NE 140) connected to network 120. Thus, in some implementations, network environment 100 may include a hybrid configuration of vNEs 110 and NEs 140.

Each vNE 110 may perform the functions of a network element utilizing a subset of the resources of the network element. For virtualized network services, vNEs 110 can be located, for example, at customer premises, at the edge of network 120, as well as in data centers of a service provider. A hypervisor 112 may configure and operate one or more virtual machines (VMs) 114 within a vNE 110. Each virtual machine 114 may have one or more virtual network functions (VNFs) 116 to provide different services. Similarly, a VNF 116 may include multiple VMs.

Network 120 may include a communications network, such as a wide area network (WAN), local area network (LAN), or another network to enable communications among vNEs 110 and between vNE 110 and orchestrator device 130. Network 120 may include multiple other network elements (not shown), such as routers, gateways, switches, and other physical devices to transport traffic between physical and virtual devices. As described further herein, vNEs 110 may communicate with NEs 140, network 120 and each other via in-band communication links 144.

Orchestrator device 130 (also referred to herein as orchestrator 130) may include a network device to coordinate, authorize, release and/or engage network function virtualization infrastructure resources, such as resources in one or more of vNEs 110. According to an implementation, orchestrator 130 may include a network functions virtualization (NFV) orchestrator to provide service orchestration and resource orchestration for network environment 100. Orchestrator 130 may communicate with vNEs 110 and NEs 140 over network 120 links 142 using, for example Simple Network Management Protocol (SNMP), Network Configuration Protocol (NETCONF)/YANG (e.g., described in Internet Engineering Task Force RFC 6241 and RFC 6020), or Internet Protocol Detail Record (IPDR) protocol.

As shown in network environment 150 of FIG. 1B, multiple network environments 100-1 through 100-$n$ (referred to generically as network environment 100) may be joined in a distributed manner. Links 146 may connect multiple regional networks 120-1 through 120-$n$ (referred to generically as network 120). Each network environment 100 may have VNFs 110 connecting to a respective regional network 120 to a regional orchestrator 130-1 through 130-$n$ (referred to generically as orchestrator 130). One or more of network environments 100 may also include a hybrid configuration with NEs 140 (not shown in FIG. 1B). Each regional orchestrator 130 coordinates self-managed functions (e.g., self-configurations, self-diagnosis of network problems and repair, etc.) for a respective regional network 120, while one of the regional orchestrators 130 (e.g., orchestrator 130-1) may also act as a main orchestrator for the entire network environment 150. Orchestrators 130 may communicate with each other using in-band or out-of-band connectivity, as indicated by links 148.

Although FIGS. 1A and 1B show exemplary network environments 100/150, in other implementations, network environments 100/150 may include fewer components, different components, differently-arranged components, or additional components than depicted in FIGS. 1A and 1B. Additionally, or alternatively, one or more components of network environments 100/150 may perform one or more tasks described as being performed by one or more other components of network environments 100/150.

Figure 2:
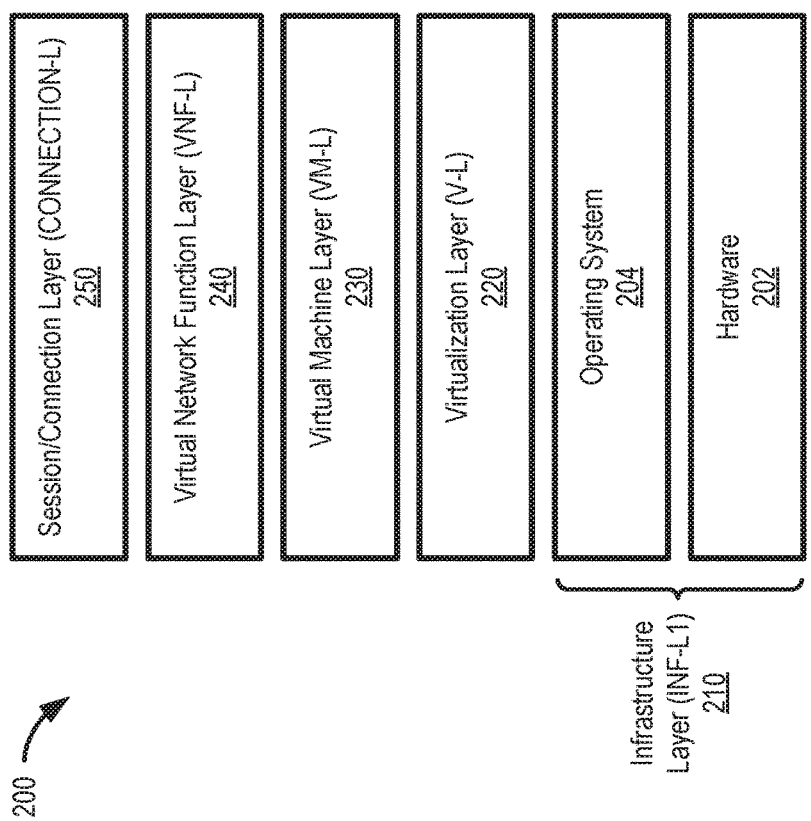
FIG. 2 is a diagram illustrating an exemplary layer framework for a self-managed virtual system.

FIG. 2 is a diagram illustrating an exemplary layer framework for a self-managed virtualized system 200. In one implementation, virtualized system 200 may be implemented in customer premises equipment, a network element, and/or a data center, any of which may be generically or collectively referred to herein as a network element.

Layers of virtualized system 200 support virtual services (e.g., cloud services) riding over connections (e.g., links 142, 144, 146, and/or 148). Generally, virtual machines (e.g., VM 114) are created on top of a virtualization layer, which is formed of a hypervisor (e.g., hypervisor 112, also referred to as a virtual machine monitor (VMM)) providing a virtual representation of hardware and an operating system underneath. Applications in the form of VNFs 116 built on top of VMs 114 terminate connections between the user and the application or between applications in a service chain of multiple VNFs 116. Thus, as shown in FIG. 2, layers of virtualized system 200 may include a hardware layer 202 and an operating system layer 204, which collectively form a first infrastructure layer (INF-L1) 210. Virtualized system 200 further includes a virtualization layer (V-L) 220, a VM layer (VM-L) 230, a VNF layer (VNF-L) 240, and a session/connection layer (CONNECTION-L) 250.

Infrastructure layer 210 may automatically detect and repair failures in hardware and an operating system for vNE 110. Hardware layer 202 of INF-L1 210 includes logic for detecting failures in hardware, such as central processing units (CPUs), memory, physical interfaces, small form-factor pluggables (SFPs), etc.; generating traps/messages (e.g., a fault or interrupt that initiates a context switch to a monitor program or debugging function) and forwarding them to orchestrator 130; and switchover from a failed primary hardware unit/system to a secondary unit/system or vice-versa. Operating system layer 204 of INF-L1 210 includes logic for detecting failures in the operating system (OS); generating traps/messages and forwarding them to orchestrator 130; and switchover from a failed primary OS unit/system to a secondary unit/system or vice-versa.

Virtualization layer 220 includes logic for detecting failures in the hypervisor (e.g., hypervisor 112); generating traps and forwarding them to orchestrator 130; and implementing repairs by, for example, switching over from a failed primary unit/system to a secondary unit/system in virtualization layer 220 or vice-versa.

VM layer 230 includes logic for detecting failures in VMs/Containers (e.g., VM 114); generating traps/messages and forwarding them to orchestrator 130; and implementing repairs by, for example, switching over from a failed primary unit/system to a secondary unit/system in VM layer 230 or vice-versa.

VNF layer 240 includes logic for detecting failures in VNFs (e.g., VNF 116) and associated service chains; generating traps/messages and forwarding them to orchestrator 130; and implementing repairs by, for example, switching over from a failed primary unit/system to a secondary unit/system in VNF layer 240 or vice-versa.

Connection layer 250 includes logic for detecting failures in connections/sessions running over virtualized system 200 due to failures beyond those in the layers below (e.g., any of layers 210-240); generating traps/messages and forwarding them to orchestrator 130; and switchover from a failed primary unit/system to a secondary unit/system or vice-versa.

Although FIG. 2 shows exemplary components of layers of the virtualized system 200, in other implementations, layers of the virtualized system 200 may include fewer layers, different layers, differently-arranged layers, or additional layers than depicted in FIG. 2. For example, in some implementations, virtualization layer 220 may be grouped with (or part of) INF-L1 210. Furthermore, service chaining among VNFs can be provided and managed by a VNF Management (VNFM) function. In that case, it is the responsibility of the VNFM to generate traps/messages for service chain failures and coordinate switchover from a failed primary unit/system to a secondary unit/system or vice-versa. For failure recovery, if multiple layers are lumped into an aggregate layer such as INF-L1 210, then all of the layers within a primary aggregate layer can be switched to a secondary aggregate layer at the same time.

Figure 3:
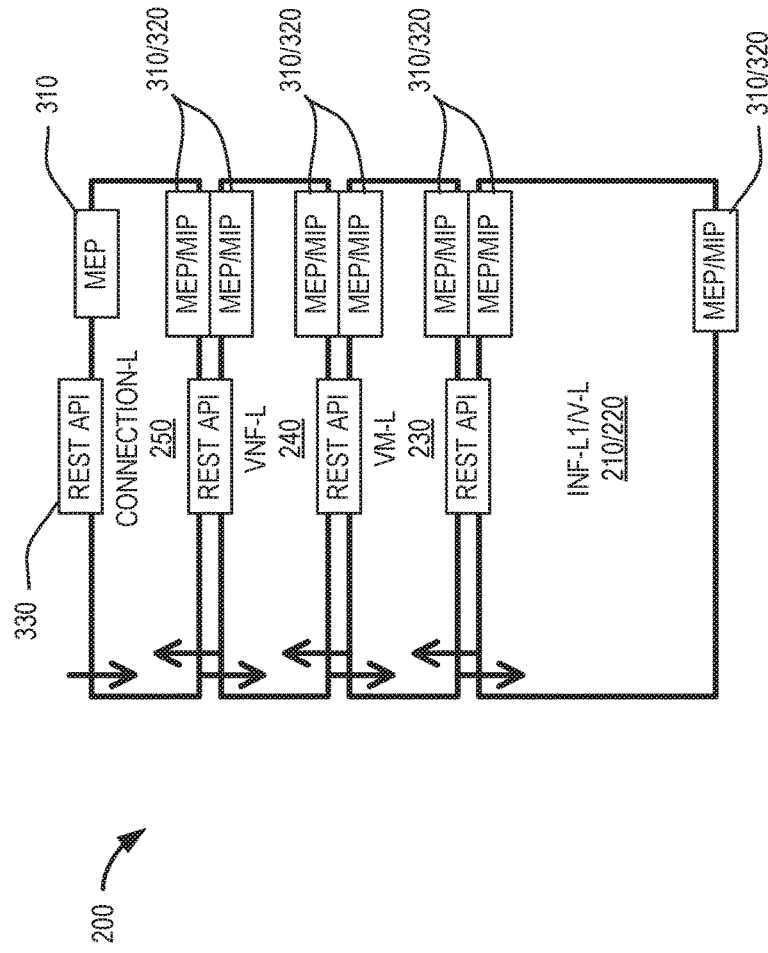
FIG. 3 is a diagram illustrating exemplary interfaces between layers in the framework of FIG. 2.

FIG. 3 is a diagram illustrating exemplary interfaces between layers in the framework of virtualized system 200. As shown in FIG. 3, interfaces may include maintenance entity group (MEG) end points (MEPs) 310 and maintenance domain intermediate points (MIPs) 320.

A MEP 310 is an actively managed Service OAM (Service Operations, Administration and Maintenance, or SOAM) entity associated with a specific service instance that can generate and receive SOAM packet data units (PDUs) and track any responses. Each MEP 310 is an end point of a single MEG, and is an end-point of a separate Maintenance Entity (ME) for each of the other MEPs in the same Maintenance Entity Group (MEG).

A MIP 320 points internally to a domain, not at a layer boundary. Connectivity fault management (CFM) frames received from MEPs 320 and other MIPs 310 are cataloged and forwarded, all CFM frames at a lower level are stopped and dropped. MIPs 320 are passive points, responding only when triggered by CFM trace route and loop-back messages. According to an implementation, each layer 210-250 includes an interface 330 that allows for inter-layer communications using representational state transfer (REST) APIs.

Figure 4:
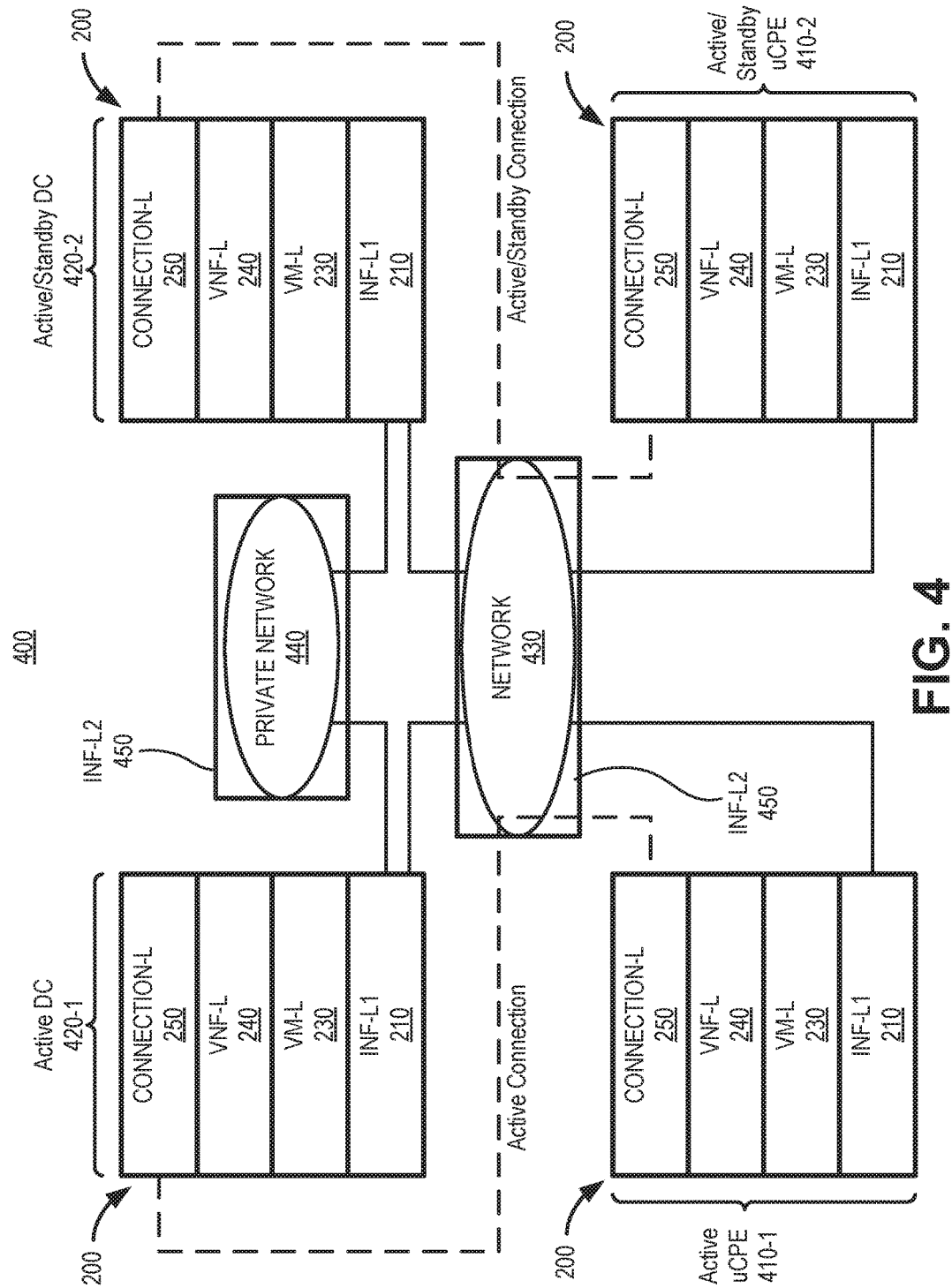
FIG. 4 is a block diagram illustrating an exemplary layer framework in a virtualized network.

For virtualized network services, VNFs (such as VNF 116) can be located at customer premises, at the edge of a wide area network (WAN) as well as in data centers. FIG. 4 depicts a virtualized network service architecture 400 where virtualized systems 200 are included in customer premises equipment (CPE) 410-1 and 410-2 (referred to herein collectively as CPE 410) and data centers (DC) 420-1 and 420-2 (referred to herein collectively as data centers 420). CPE 410 and data centers 420 are connected by a WAN 430. Data centers 420 may communicate with each other via a WAN or LAN 440.

CPE 410 may include a computing device or server device, which may include universal CPE (uCPE), associated with a customer (e.g., an enterprise customer). As shown in FIG. 4, a second infrastructure layer (INF-L2) 450 is added to represent networking resources between CPE 410 and DC 420 in an NFV-based service configuration. According to one implementation, CPE 410-1 may have an active connection with data center 420-1, while CPE 410-2 and data center 420-2 may be redundant active and/or standby units. Data center 420 may include a computing device or network device associated with, for example, a service provider.

Network 430 may include one or multiple networks of one or multiple types that provide communications between CPE 410 and data centers 420. Network 430 may be implemented to include a wide area network (WAN), a metropolitan area network (MAN), a service or an application-layer network, the Internet, the World Wide Web, an Internet Protocol Multimedia Subsystem (IMS) network, a Rich Communication Service (RCS) network, a cloud network, a packet-switched network, a private network, a public network, a computer network, a software-defined network, an IP network, a service provider network, or some combination thereof. Although shown as a single element in FIG. 4, network 430 may include a number of separate networks.

Private network 440 may include one or multiple networks of one or multiple types. Private network 440 may include, for example, one or more private IP networks that use a private Internet protocol (IP) address space. Private network 120 may include a local area network (LAN), an intranet, a private wide area network (WAN), etc. In one implementation, private network 120 may implement one or more Virtual Private Networks (VPNs) for providing communication between, for example, data centers 420. Private network 120 may be protected/separated from other networks, such as network 430, by a firewall.

Figure 5:
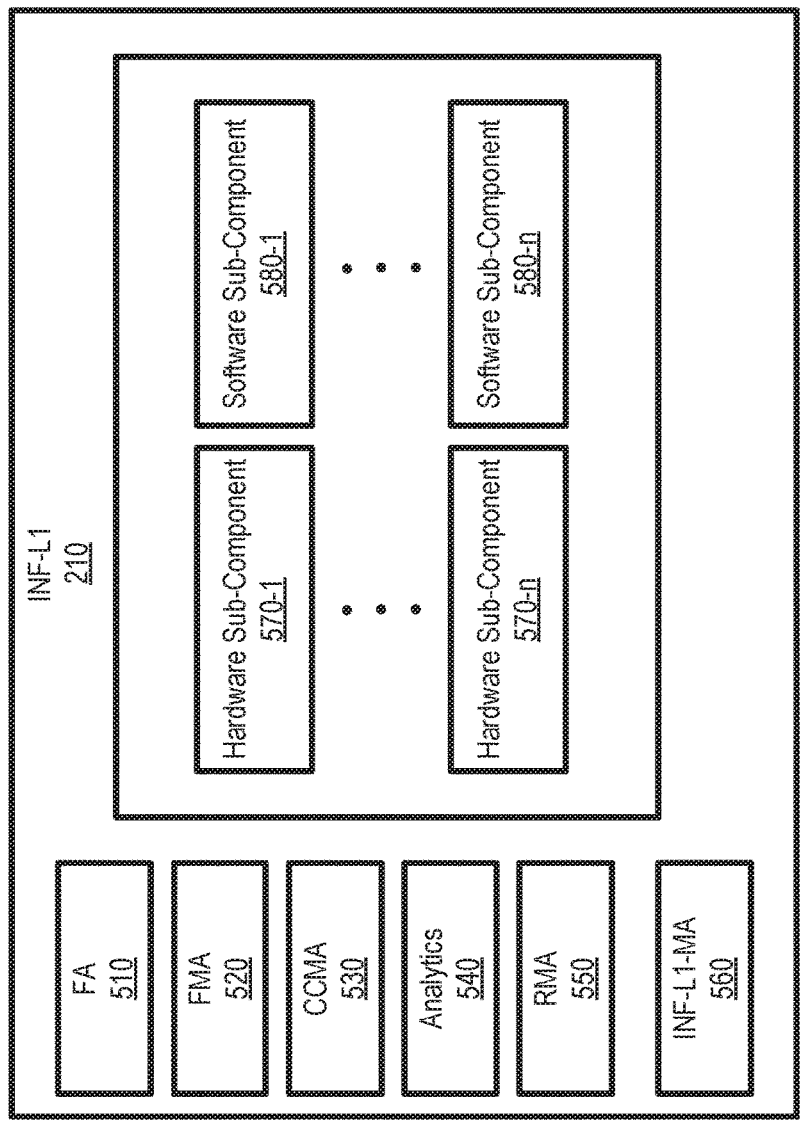
FIG. 5 is a block diagram illustrating exemplary logical components of a first infrastructure layer of FIG. 2.

FIG. 5 is a block diagram illustrating exemplary logical components of first infrastructure layer 210. Each of the self-managed layers (e.g., first infrastructure layer 210, second infrastructure layer 450, virtualization layer 220, VM layer 230, VNF layer 240, and connection layer 250) may have a set of logical components (also referred to as agents) common within each layer and another set of agents that may be unique to each layer. Common agents may include a fix agent (FA) 510, a fault management agent (FMA) 520, a configuration and capacity management agent (CCMA) 530, an analytics agent 540, and a resource maintenance agent (RMA) 550. First infrastructure layer 210 may also include a maintenance agent (INF-L1-MA) 560, redundant active/standby hardware sub-components 570-1 through 570-n, and software sub-components with local or cloud redundancies 580-1 through 580-m.

Fix agent 510 may use artificial intelligence (AI) rules to automatically fix a local failure, when feasible. Fix agent 510 may also inform vNEs, NEs, network administrators and management systems (e.g., orchestrator 130, an element manager (EM), a controller, a virtual network manager (VNM), a network functions virtualization orchestrator, etc.) about a fix status using the self-managed packet/frame described further herein in connection with, for example, FIG. 11. According to an implementation, fix agent 510 may estimate a time to repair (or fix time) for a local failure, when fix agent 510 determines that a local fix is feasible.

Since each layer 210-250 has an independent fix agent 510 for failure recovery, each layer may have its own failure recovery timer. The failure recovery time may be the summation of the time for failure identification and the time for switching from failed entity to a healthy standby entity. In one implementation, fix times may generally increase from infrastructure layer 210 through connection layer 250, such that a failure recovery in a lower layer (e.g., infrastructure layer 210) may be performed/attempted before higher layers (e.g., virtualization layer 220) make an attempt to recover. If a higher layer such as VNF layer 240, for example, is capable of recovering faster than the lower layers, switchover timers should be configured in such a way that VNF layer 240 performs switching before the lower layers make a switching attempt.

Assume the failure recovery time for INF-L1 210 is T11; the failure recovery time for VM-L 230 is T2; the failure recovery time for VNF-L 240 is T3; the failure recovery time for INF-L2 450 is T4; and the failure recovery time for CONNECTION-L 250 is T5, and that T11<T4<T2<T3<T5. Each layer failure is recovered by its own recovery mechanism within its failure recovery time interval. If for some reason, the layer with failure could not recover within its own time interval, INF-L1 takes the responsibility and switches from the failed primary component (or sub-component) to the healthy secondary component (or sub-component). Therefore, INF-L1 has another timer, T12, where T11<T4<T2<T3<T5<T12.

Figure 15:
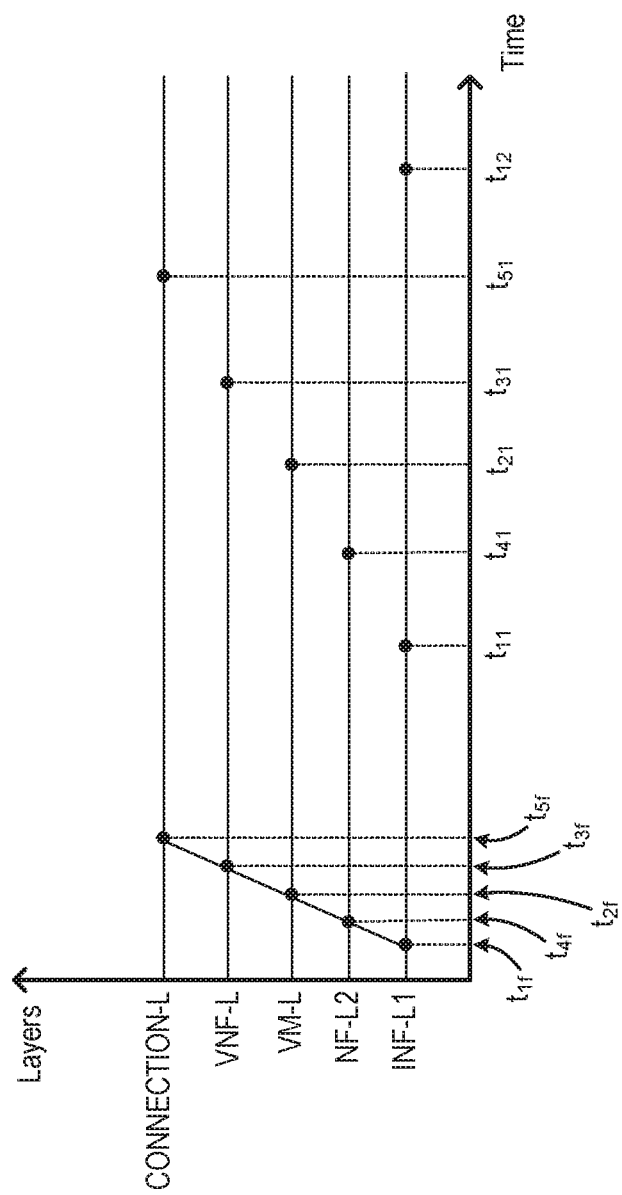
FIG. 15 is a diagram illustrating relationships between failure recovery timers according to an exemplary implementation.

Relationships among the timers are depicted in FIG. 15. In FIG. 15, $T11=t_{11}-t_{1f}$; $T4=t_{41}-t_{4f}$; $T2=t_{21}-t_{2f}$; $T3=t_{31}-t_{3f}$; $T4=t_{41}-t_{4f}$; and $T5=t_{51}-t_{5f}$. Assume there is a failure in INF-L1. The INF-L1 failure notification at $t=t_{1f}$ is propagated to INF-L2. INF-L2 is informed about INF-L1 failure at $t=t_{4f}$ after a delay (i.e. Failure Notification Propagation Delay=$T_{fnpd}=t_{4f}-t_{1f}$). This logic holds for other layers as well. For example, the failure propagation delay between CONNECTION-L and VNF-L is $T_{fnpd}=t_{5f}-t_{3f}$. Given this failure occurred in INF-L1, INF-L1 needs to recover from the failure before higher layers make an attempt to recover. That means INF-L2 waits as much as T11. In other words, INF-L2 needs to initiate its recovery process after at least a delay of $T11-t_{4f}$.

Fault management agent 520 may generally enable diagnostics within individual layers and corresponding corrections. Fault management agent 520 may support MEP 310 and/or MIP 320 communications, run periodic continuity checks, run diagnostics, and identify cause of failures when there is a failure in a corresponding layer.

Configuration and capacity management agent 530 may initiate auto-configuration; monitor capacity, system load, and system performance; collect measurements; make resource allocation or reject capacity requests; and predict capacity. Configuration and capacity management agent 530 may also initiate throughput impacting algorithms, such as single-root input/output virtualization (SR-IoV), enact CPU pinning, or application of Data Plane Development Kit (DPDK) framework.

Analytics agent 540 may provide support for functions of other agents in a layer, including collecting historical data and providing data correlation. For example, analytics agent 540 may help fault management agent 520 to relate failures, help configuration and capacity management agent 530 to predict future capacity, and help fix agent 510 to fix problems by providing historical behavioral data.

Resource maintenance agent 550 may monitor hardware entities such as vCPU, CPU, memory, physical ports, logical ports, IP addresses, VLAN IDs, communication channels, buffers, backplane, power supplies, etc., and take appropriate maintenance actions to protect hardware resource during failures (e.g., to prevent cascading failures, protect components, prevent overloading, etc.).

Maintenance agent 560 may monitor the operating system, the hypervisor (e.g., hypervisor 112), and management protocols; work with fault management agent 520 to identify failures; work with fix agent 510 for fixes; work with configuration and capacity management agent 530 for auto-configuration and capacity management; and work with resource maintenance agent 550 for managing hardware resources. Maintenance agent 560 may also report auto-configuration status (e.g., initiated, completed, or failed) to all related parties in virtualized network service architecture 400. According to an implementation, maintenance agent 560 may report failures, indicating fixing entity and length of the time for the fix. If the problem is determined to be not fixable after a set number of attempts (e.g., two, three, zero, etc.), maintenance agent 560 may send a message to orchestrator 130 asking for help at the failure site or fixing remotely.

Hardware sub-components 570 may include a replaceable hardware entity, such as one or more chipsets, processors, microprocessors, data processors, co-processors, application specific integrated circuits (ASICs), controllers, programmable logic devices, field-programmable gate arrays (FPGAs), application specific instruction-set processors (ASIPs), system-on-chips (SoCs), central processing units (e.g., one or multiple cores), microcontrollers, and/or some other type of sub-component. A hardware sub-component 570 may be a physical piece of equipment that can be independently replaceable (e.g., via physical change-out or switch to a backup) if a failure is detected.

Software sub-components 580 may include a replaceable software module (e.g., that resides on one of hardware sub-components 570). A software sub-component 580 may be a distinct piece of code that can be independently replaceable if a failure is detected. Redundancy for hardware sub-components 570 and/or software sub-components 580 could be within a single first infrastructure layer 210 or with two different first infrastructure layers 210.

Figure 6:
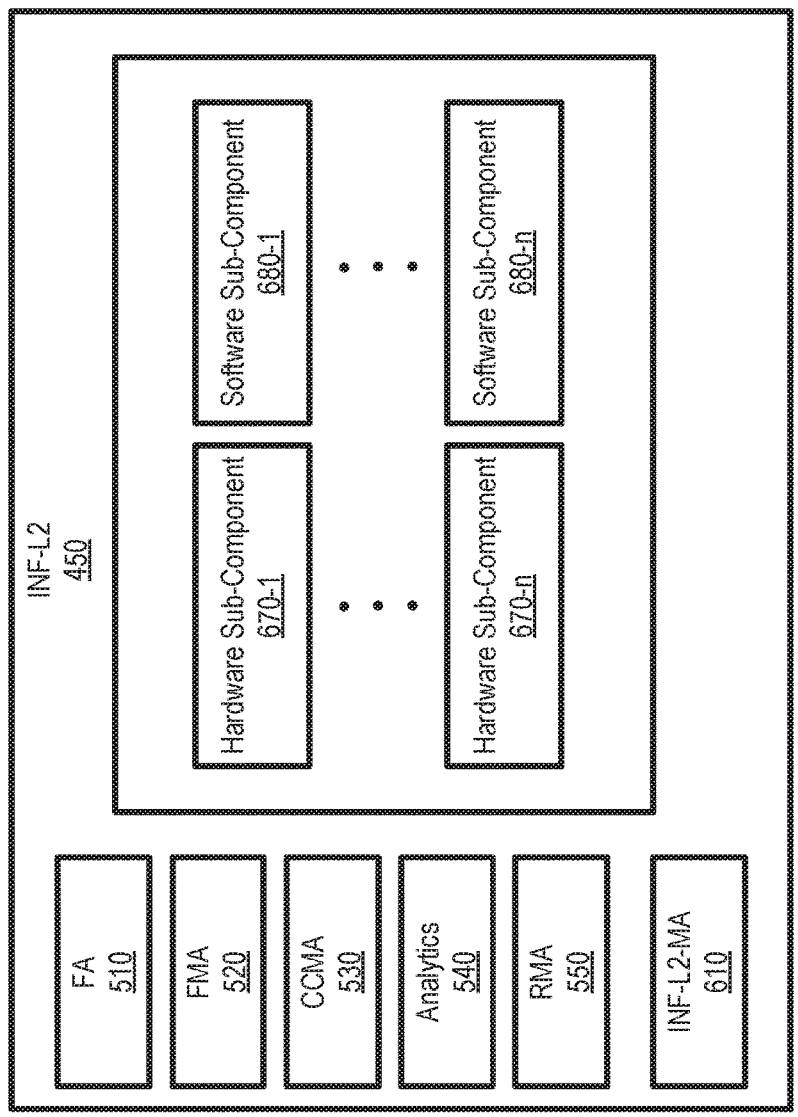
FIG. 6 is a block diagram illustrating exemplary logical components of an infrastructure layer for virtualized systems of FIG. 4.

FIG. 6 is a block diagram illustrating exemplary logical components of second infrastructure layer 450. Second infrastructure layer 210 may include fix agent 510, fault management agent 520, configuration and capacity management agent 530, analytics agent 540, resource maintenance agent 550, a maintenance agent (INF-L2-MA) 610, redundant active/standby hardware sub-components 670-1 through 670-*n*, and software sub-components with local or cloud redundancies 680-1 through 680-*m*. Fix agent 510, fault management agent 520, configuration and capacity management agent 530, analytics agent 540, and resource maintenance agent 550 may include features described above in connection with FIG. 5.

Maintenance agent 610 may monitor network protocols (e.g., Border Gateway Protocol (BGP)) and management protocols (e.g. simple network management protocol (SNMP)); work with fault management agent 520 to identify failures; work with fix agent 510 for fixes; work with configuration and capacity management agent 530 for capacity management; and work with resource maintenance agent 550 for hardware resource management. Maintenance agent 610 may also report auto-configuration status (e.g., initiated, completed, or failed) to all related parties. According to an implementation, maintenance agent 610 may report failures, indicating fixing entity and length of the time for the fix. If the problem is determined to be not fixable after a set number of attempts (e.g., two, three, zero, etc.), maintenance agent 610 may send a message to regional orchestrator 130 or main orchestrator 130 asking for help at the failure site or fixing remotely.

Hardware sub-components 670, similar to hardware sub-components 570, may include a replaceable hardware entity, such as one or more chipsets, processors, microprocessors, data processors, co-processors, application specific integrated circuits (ASICs), controllers, programmable logic devices, field-programmable gate arrays (FPGAs), application specific instruction-set processors (ASIPs), system-on-chips (SoCs), central processing units (e.g., one or multiple cores), microcontrollers, and/or some other type of sub-component. A hardware sub-component 670 may be a physical piece of equipment that can be independently replaceable if a failure is detected.

Software sub-components 680, similar to software sub-components 580, may include a replaceable software module (e.g., that resides on one of hardware sub-components 670). A software sub-component 580 may be a distinct piece of code that can be independently replaceable if a failure is detected.

Figure 7:
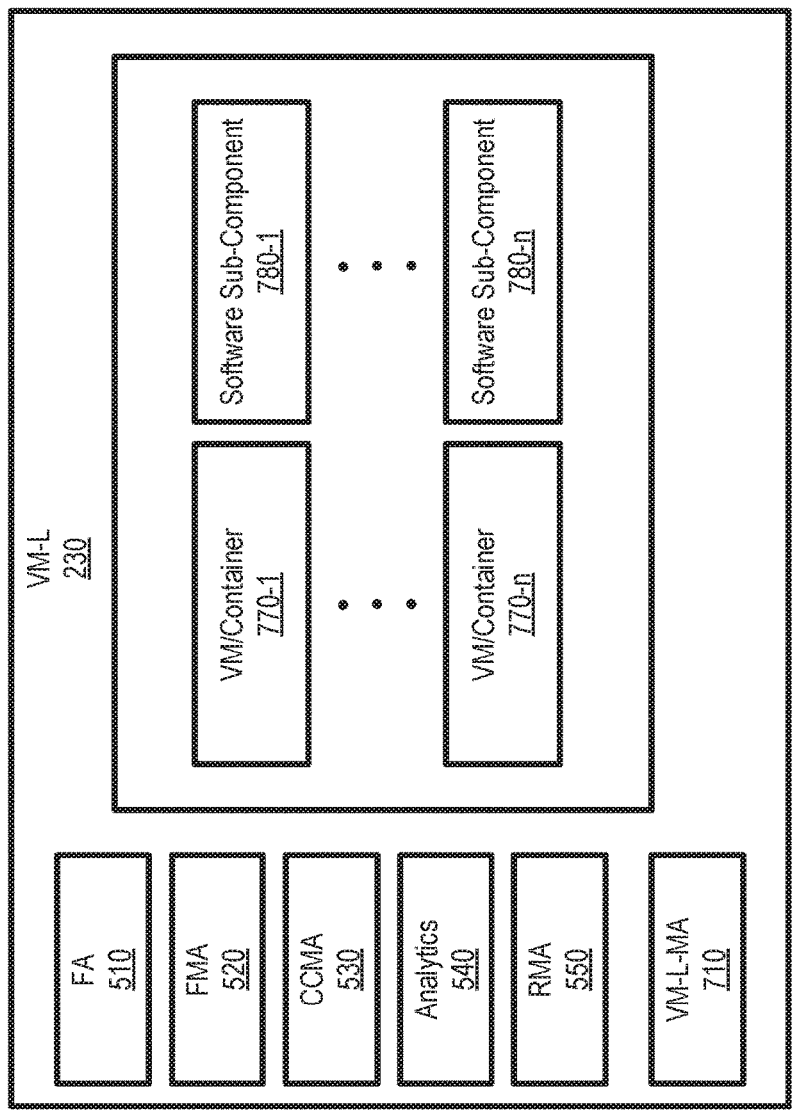
FIG. 7 is a block diagram illustrating exemplary logical components of a virtual machine layer of FIG. 2.

FIG. 7 is a block diagram illustrating exemplary logical components of virtual machine layer 230. Virtual machine layer 230 may include fix agent 510, fault management agent 520, configuration and capacity management agent 530, analytics agent 540, resource maintenance agent 550, a maintenance agent (VM-L-MA) 710, redundant active/standby hardware sub-components 770-1 through 770-*n*, and software sub-components with local or cloud redundancies 780-1 through 780-*m*. Fix agent 510, fault management agent 520, configuration and capacity management agent 530, analytics agent 540, and resource maintenance agent 550 may include features described above in connection with FIG. 5.

Maintenance agent 710 may monitor cloud computing platforms (such as OpenStack), VMs, and service chains; work with fault management agent 520 to identify failures; work with fix agent 510 for fixes; work with configuration and capacity management agent 530 for capacity management; and work with resource maintenance agent 550 for hardware resource management. Maintenance agent 710 may also report auto-configuration status (e.g., initiated, completed, or failed) to all related parties (e.g., other layers 210-250, orchestrator 130, NEs, vNEs, field technicians, network administrators, etc.). According to an implementation, maintenance agent 710 may report failures, indicating fixing entity and length of the time for the fix. If the problem is determined to be not fixable after a set number of attempts (e.g., two, three, zero, etc.), maintenance agent 710 may send a message to orchestrator 130 asking for help at the site or fixing remotely.

VM/containers 770 may include a replaceable software entity for operating a VM (e.g., VM 114) or a virtualized container. For example, VM/containers 770 may include a VM hypervisor, a container manager, or shared operating system components. VM-L 230 may not include a dedicated hardware component since VM/containers 770 are defined as software.

Software sub-components 780 may include a replaceable software module for operating an instance of a VM (e.g., a VM that resides on one of VM/containers 770) or an instance of a virtualized container. A software sub-component 780 may be a distinct piece of code that can be independently replaceable if a failure is detected.

Figure 8:
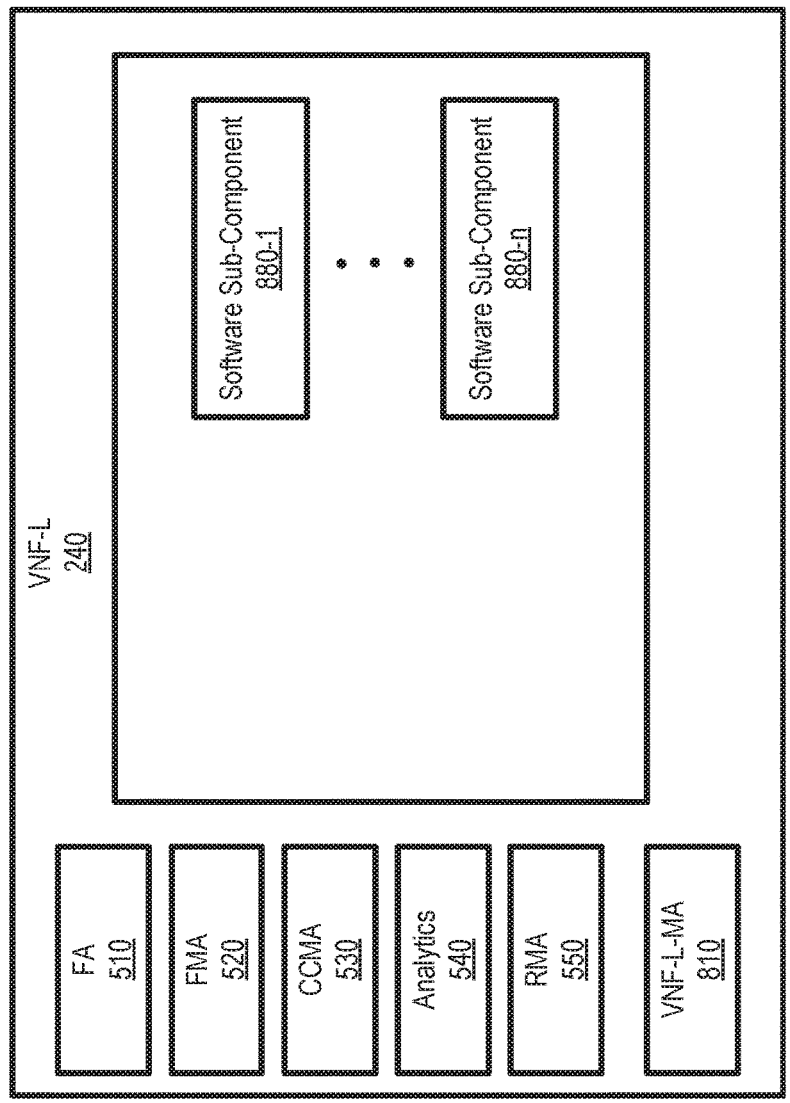
FIG. 8 is a block diagram illustrating exemplary logical components of a virtual network function layer of FIG. 2.

FIG. 8 is a block diagram illustrating exemplary logical components of virtual network function layer (VNF-L) 240. VNF-L 240 may include fix agent 510, fault management agent 520, configuration and capacity management agent 530, analytics agent 540, resource maintenance agent 550, a maintenance agent (VNF-L-MA) 810, and software sub-components 880-1 through **880-*m*. Fix agent 510, fault management agent 520, configuration and capacity management agent 530, analytics agent 540, and resource maintenance agent 550 may include features described above in connection with FIG. 5**.

Maintenance agent 810 may monitor VNFs; work with fault management agent 520 to identify failures; work with fix agent 510 for fixes, work with configuration and capacity management agent 530 for capacity management including scale-in and out, and work with resource maintenance agent 550 for hardware resource management. Maintenance agent 810 may also report auto-configuration status (e.g., initiated, completed, or failed) to all related parties. According to an implementation, maintenance agent 810 may report failures, indicating fixing entity and length of the time for the fix. If the problem is determined to be not fixable after a set number of attempts (e.g., two, three, zero, etc.), maintenance agent 810 may send a message to orchestrator 130 asking for help at the failure site or fixing remotely.

Software sub-components 880 may include a replaceable software module for executing a VNF (e.g., VNF 116). Local active/standby software sub-components 880 could be within a single VNF-L 240 or within two or more VNF-Ls 240. VNF-L 240 may not include a dedicated hardware component since the VNF is defined as software.

Figure 9:
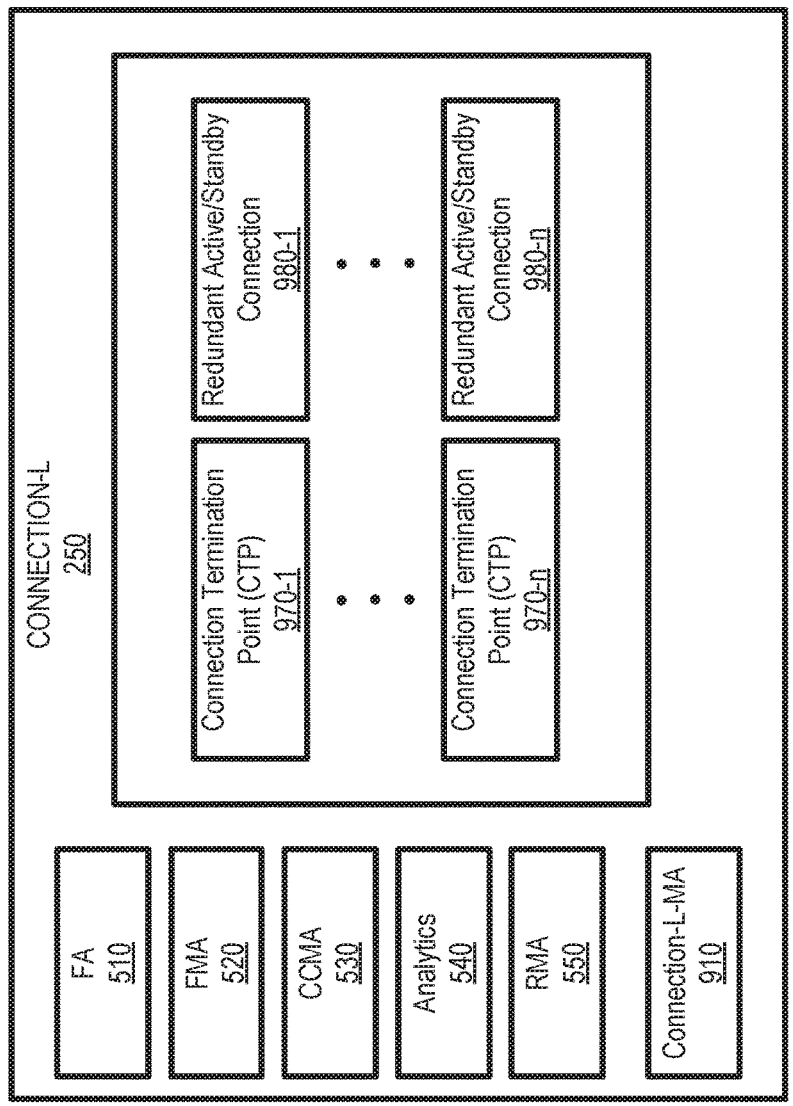
FIG. 9 is a block diagram illustrating exemplary logical components of a connection layer of FIG. 2.

FIG. 9 is a block diagram illustrating exemplary logical components of connection layer (CONNECTION-L) 250. Connection layer 250 may include fix agent 510, fault management agent 520, configuration and capacity management agent 530, analytics agent 540, resource maintenance agent 550, a maintenance agent (CONNECTION-L-MA) 910, connection termination points (CTPs) 970-1 through **970-*n*, and redundant active/standby connections 980-1 through 980-*m*. Fix agent 510, fault management agent 520, configuration and capacity management agent 530, analytics agent 540, and resource maintenance agent 550 may include features described above in connection with FIG. 5**.

Maintenance agent 910 may monitor CTPs and connections/sessions; work with fault management agent 520 to identify failures; work with fix agent 510 for fixes; work with configuration and capacity management agent 530 for bandwidth profiles, class of service (CoS) and buffering (e.g., conditional access control (CAC)) allocation; and work with resource maintenance agent 550 for hardware resource management.

Connection termination points 970 may include physical connections and or ports for supporting a VNF. CTP 970 may be physical or virtual equipment that can be independently replaceable if a failure is detected. CTPs 970 and active/standby connections 980 could be located in different ports of the same INF-L1 and INF-L2, or different ports of different INF-L1 and INF-L2.

Figure 10:
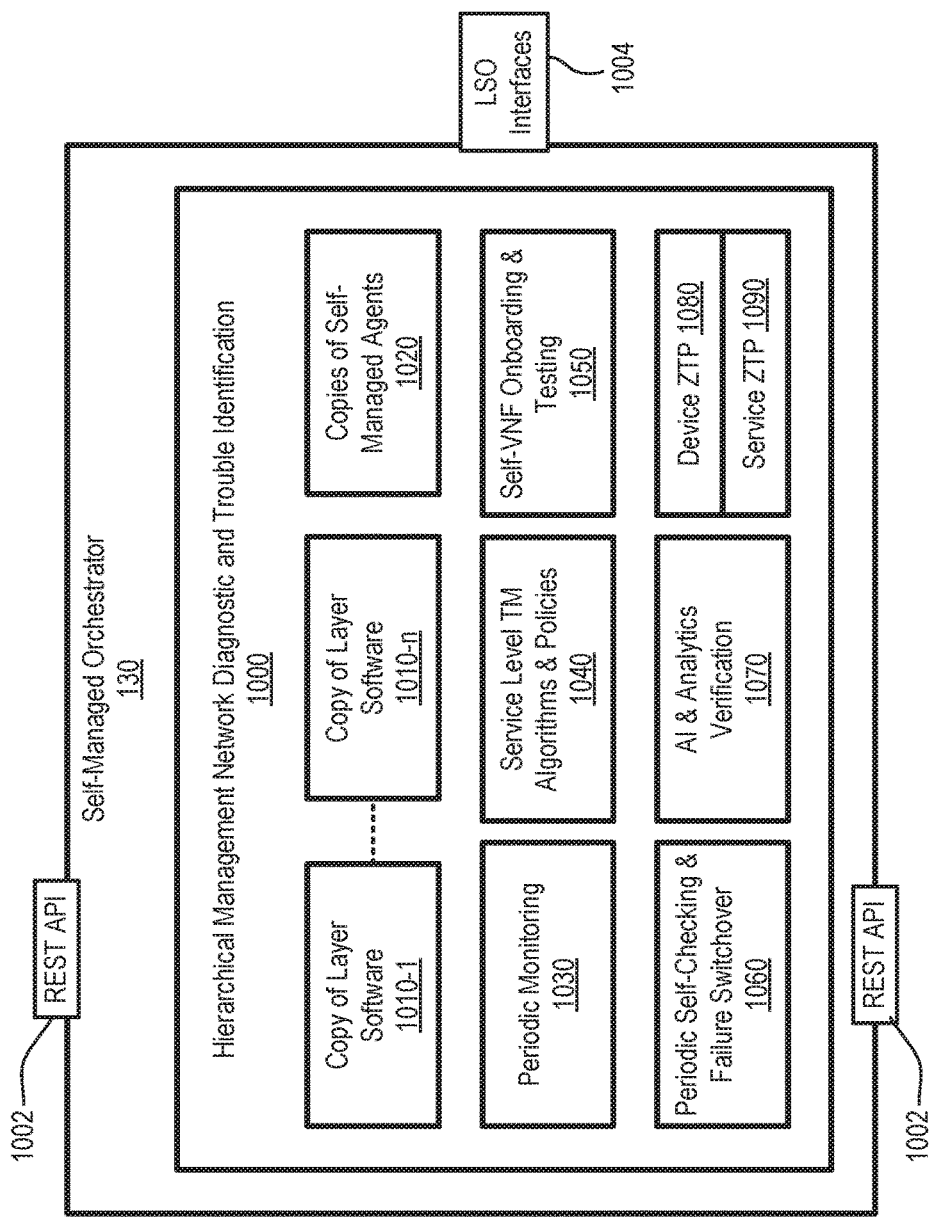
FIG. 10 is a block diagram illustrating exemplary logical components of an orchestrator device of FIGS. 1 and 2.

FIG. 10 is a block diagram illustrating exemplary logical components of self-managed orchestrator 130. Orchestrator 130 may include copies 1010-1 through **1010-*n* of each layer software, copies 1020 of each self-managed agent, a periodic monitoring unit 1030, a service level traffic management (TM) and policies unit 1040, a self-VNF onboarding and testing unit 1050, a periodic self-checking and failure switchover unit 1060, an artificial intelligence (AI) and analytics verification unit 1070, a device zero-touch provisioning unit 1080, and a service zero-touch provisioning unit 1090. Orchestrator 130 may use REST APIs 1002 for north bound and south bound interfaces (via link 142). Orchestrator 130 may use local shared object (LSO) interfaces 1004 to communicate with partner orchestrators 130 (e.g., via link 148**).

Copies 1010 of layer software may include software modules for self-managed virtual systems within any of layers 210-250. Copies 1020 of self-managed agents may include copies agents for each of layers 210-250, including copies of fix agent 510, fault management agent 520, configuration and capacity management agent 530, analytics agent 540, and resource maintenance agent 550, as well as layer-specific agents (e.g., maintenance agents 560, 610, 710, etc.).

Periodic monitoring unit 1030 may include software to monitor layers 210-250 and communicate with the management systems (e.g., hypervisors, etc.) at each layer of virtualized system 200. Periodic monitoring unit 1030 may perform monitoring of layers and management networks. Periodic monitoring unit 1030 may also isolate, trouble shoot, and fix problems within the management networks. Thus, periodic monitoring unit 1030 may be able to identify network management level failures and fix management network level issues beyond the capabilities of layers 210-250. In one implementation, periodic monitoring unit 1030 may estimate a fix time for a failure that is going to be repaired and communicate that time estimate to related parties/functions in the network.

Service level traffic management algorithms and policies unit 1040 may include algorithms and policies for managing data flows and services. For example, service level traffic management algorithms and policies unit 1040 may include connection admission control (CAC) load balancing, and congestion control policies and/or algorithms.

Self-VNF onboarding and testing unit 1050 may integrate new virtualized systems 200, such as a new vNEs 110, into a network 120. Self-VNF onboarding and testing unit 1050 may automatically onboard vNE 110 and ensure vNE 110 is ready to pass traffic within network 120 or between networks 120.

Periodic self-checking and failure switchover unit 1060 may monitor redundancies and ensure geographic redundancy for centralized self-managed networks or distributed self-managed virtual networks, such as network environment 150. Periodic self-checking and failure switchover unit 1060 may automatically initiate a switch to a back-up orchestrator 130 during failure of a primary orchestrator 130.

Artificial intelligence and analytics verification unit 1070 may receive and analyze failure reports (e.g., using common in-band message format described in FIG. 11) from layers of virtualized systems 200. For example, artificial intelligence and analytics verification unit 1070 may confirm or override an assessment from one of layers 210-250 that a particular fix is local. Additionally, or alternatively, artificial intelligence and analytics verification unit 1070 may determine if a problem is fixable by orchestrator 130.

Device zero-touch provisioning unit 1080 and service zero-touch provisioning unit 1090 may allow new devices and services, respectively, to be provisioned and configured automatically for service within network 120.

Although FIG. 10 shows exemplary components of orchestrator 130, in other implementations, orchestrator 130 may include fewer components, different components, or additional components than depicted in FIG. 10. Additionally, or alternatively, one or more components of orchestrator 130 may perform one or more tasks described as being performed by one or more other components of orchestrator 130.

Figure 11:
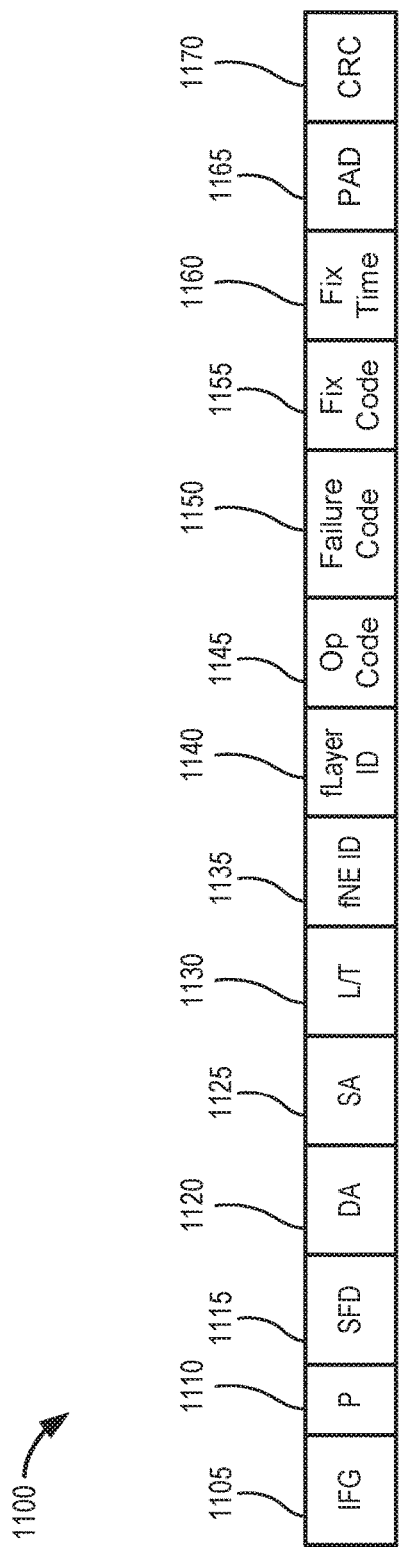
FIG. 11 is an example of an Ethernet frame for in-band communications according to an implementation described herein.

FIG. 11 is a diagram of an exemplary message format 1100 for an Ethernet frame for self-managed in-band communications (e.g., failure notifications) according to an implementation. Message format 1100 may provide a common packet/message for communicating auto-configuration status, failures, and operational status, whether it is a loss of signal (LOS), an alarm indication signal (AIS), a loss of frame (LOF), remote defect indication (RDI), OS issues, VNF issues, protocol issues, or hardware issues. Thus, message format 1100 provides a capability in contrast with conventional virtual network communications, where currently, there is no concept of communicating failures at the sub-component (virtualized or non-virtualized) level with one message format. For example, an AIS message is different than an LOF message.

Use of message format 1100 (e.g., within network environments 100/150 or virtualized network service architecture 400) enables communicating a failure type to all related parties (e.g., layers 210-250, orchestrator 130, field technicians, network administrators, etc.). In contrast, AIS, RDI, LOS, and LOF messages may not indicate detailed information about a failed component. Generally, message format 1100 may indicate who will fix a detected failure (e.g., a particular layer 210-250, orchestrator 130, or field technician) and a time interval to repair. The time interval may enable other layers, orchestrator 130, field technicians, and/or users to determine how to manage traffic during the failure (e.g., store/buffer traffic, reroute traffic, etc.). Message format 1100 may also be used to communicate an operational status of the failed component after repair.

As shown in FIG. 11, message format 1100 may include field for an interframe gap 1105, a preamble (P) 1110, a start of frame delimiter (SFD) 1115, a destination address (DA) 1120, station address (SA) 1125, a length/type (L/T) indicator 1130, a failed component identifier (fNE ID) 1135, a failed layer identifier (fLayer ID) 1140, an operational (Op) code 1145, a failure code 1150, a fix code 1155, a fix time 1160, a pad 1165, and a cyclic redundancy check (CRC) value 1170.

Interframe gap 1105 may include a specific number of bytes (e.g., 12 bytes) to separate frames. Preamble 1110 and start of frame delimiter 1115 may include bytes to indicate the start of a frame (e.g., 7 bytes for preamble 1110 and one byte for Start of Frame Delimiter (SFD) 115). Destination address 1120 may include a multicast destination address to simultaneously provide the failure notification to other vNEs 110, orchestrator 130, and field technician devices connected to the network. Station address 1125 may include the source MAC address of the sending station (e.g., uCPE 410, DC 420, etc.).

Length/type indicator 1130 may include a length of frame or data type. Failed component identifier 1135 may include a unique identifier (e.g., a MAC address or other identifier) associated with a failed component of vNE 110. Failed layer identifier 1140 may include a layer identifier corresponding to one of layers 210-250.

Operational code 1145 may include, for example, an "enabled" or "disabled" indication for the component identified in failed component identifier 1135. Failure code 1150 may include failure code, such an International Telecommunication Union (ITU) failure code.

Fix code 1155 may include a single byte identifying a fixing entity/layer, such as INF-L1, INF-L2, VM-L, VNF-L, CONNECTION-L, Regional Orchestrator, Orchestrator, field technician, unidentified entity, or inconclusive diagnostic. Fix time 1160 may include a value (e.g., in seconds) indicating the projected fix time by the layer, orchestrator, or technician indicated in fix code 1155. Pad 1165 may include zero values as a separator. CRC value 1170 may include an error detection code.

According to other exemplary implementations, message format 1100 may include fewer fields, different fields, additional fields, or differently-fields than depicted in FIG. 11.

Figure 12:
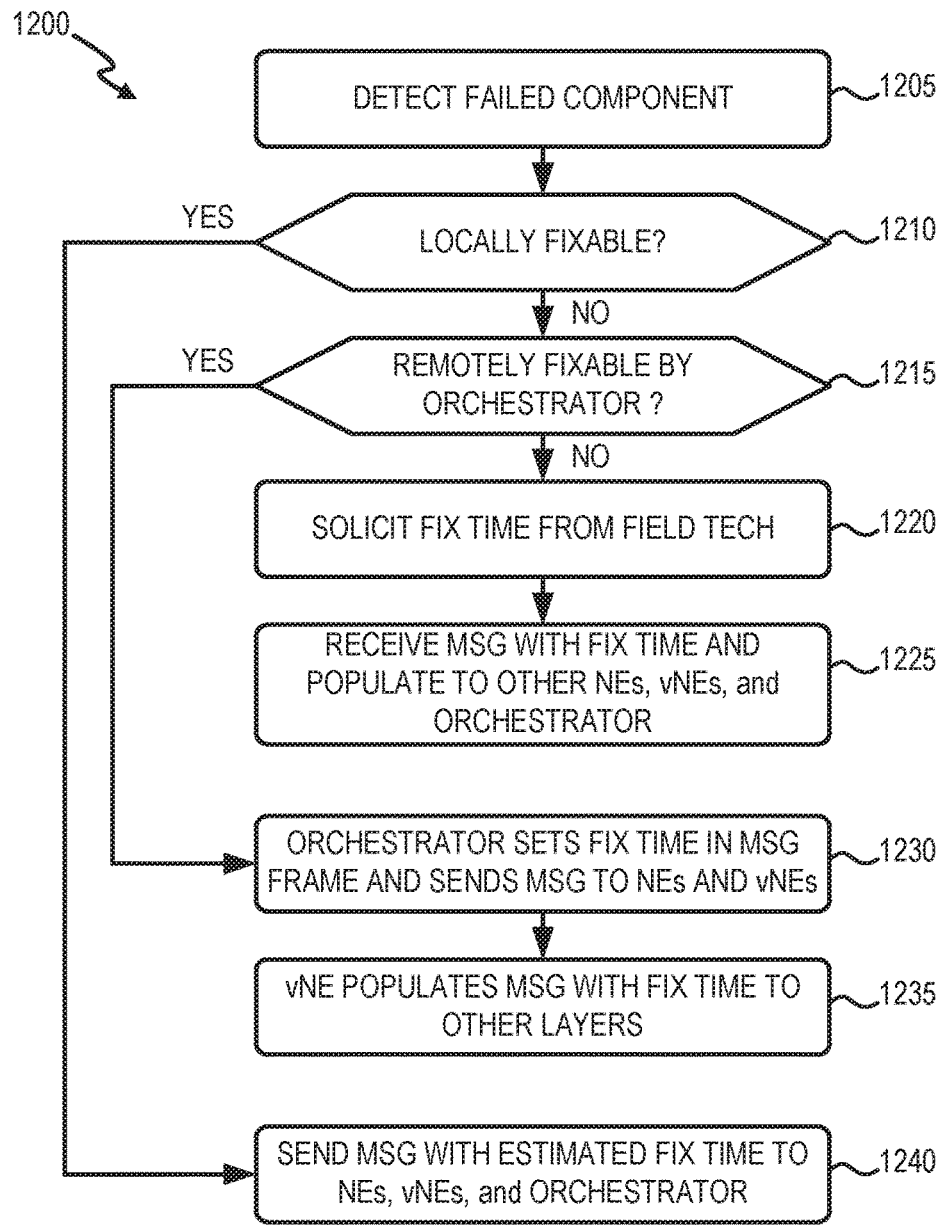
FIG. 12 is a flow diagram illustrating an exemplary process for using in-band communications for a centralized self-managed virtual network and services.

FIG. 12 is a flow diagram illustrating an exemplary process 1200 of using in-band communications for centralized virtual networks, according to an implementation described herein. Process 1200 may be implemented by one or more vNEs 110 in network environment 100. In another implementation, process 1200 may be implemented by vNE 110 in conjunction with orchestrator 130 in network environment 100.

Referring to FIG. 12, process 1200 may include detecting a failed component (block 1205) and determining if the failed component is locally fixable (block 1210). For example, vNE 110 (e.g., a fault management agent 520 and a corresponding maintenance agent 560, 610, 710, etc.) may detect a failed component for a particular layer. vNE 110 (e.g., fix agent 510) may determine whether or not the failure can be resolved locally.

If the failed component is not locally fixable (block 1210—NO), process 1200 may include determining if the failed component is remotely fixable by the orchestrator (block 1215). For example, a vNE 110 (e.g., connection layer maintenance agent 910) may provide a failure notification (e.g., using message format 1100) to orchestrator 130. The failure notification may include an indication that the failed component is not locally fixable, a suggested fixing entity, or an inconclusive diagnostic (e.g., in fix code 1155). Orchestrator 130 may receive the failure notification and determine if an automatic remote repair is possible.

If the failed component is not remotely fixable by the orchestrator (block 1215—NO), a repair time may be solicited from a field technician (block 1220), and a message with a fix time may be received and populated to other NEs, vNEs, and the orchestrator (block 1225). For example, orchestrator 130 (e.g., hierarchical management network diagnostic and trouble identification unit 1000) may determine that an automated remote fix is not available for the corresponding failure notification. Orchestrator 130 may provide another failure notification message (e.g., using message format 1100 or another type of message) to request technician input for a repair time. The technician may set a fix time and provide a message to the failed vNE 110 (e.g., connection layer maintenance agent 910) and other vNEs 110 to communicate the estimated repair time and other failure information to other layers and entities.

Returning to block 1215, if the failed component is remotely fixable by the orchestrator (block 1215—YES), process 1200 may include setting a fix time by the orchestrator and sending message to NEs and vNEs (block 1230), and populating the message with the fix time to other layers (block 1235). For example, orchestrator 130 (e.g., hierarchical management network diagnostic and trouble identification unit 1000) may determine that an automated remote fix is available for the corresponding failure notification. Orchestrator 130 may provide another failure notification message (e.g., using message format 1100 or another type of message) to indicate a repair time (e.g., in fix time 1160) for the failed component. vNE 110 may receive the failure notification message from orchestrator 130 and may communicate the estimated repair time and other failure information to other layers and entities.

Returning to block 1210, if the failed component is locally fixable (block 1210—YES), process 1200 may include sending a message with the estimated fix time to the network elements, vNEs, and the orchestrator (block 1240). For example, vNE 110 (e.g., fix agent 510) may determine the failure can be resolved locally and generate a failure notification message (e.g., using message format 1100 or another type of message) to indicate itself as the repair agent (e.g., in fix code 1155) and an estimated repair time (e.g., in fix time 1160). The failure notification may be populated, for example, to recipients designated in multicast address 1120.

Figure 13:
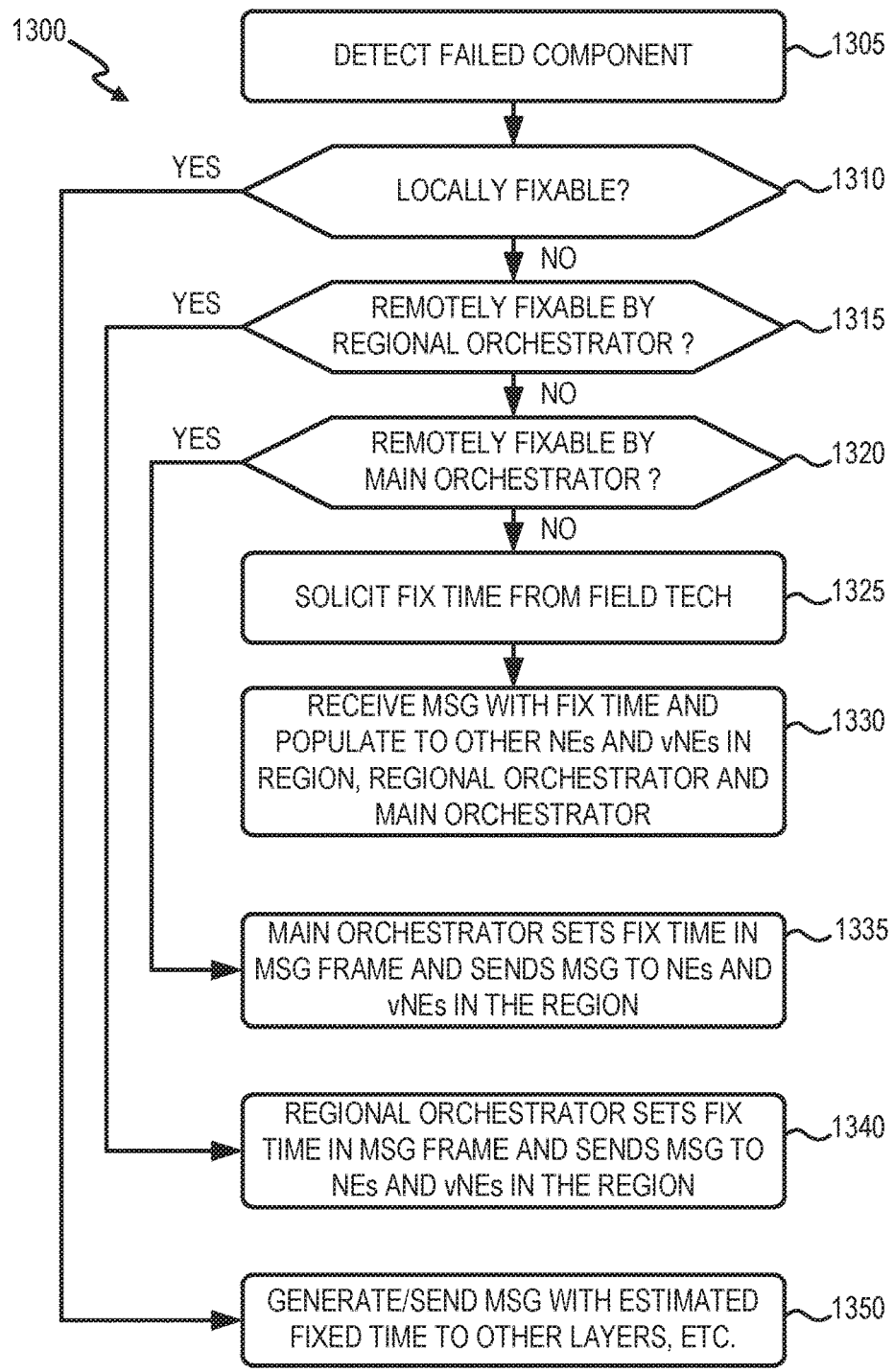
FIG. 13 is a flow diagram illustrating an exemplary process for using in-band communications for a distributed self-managed virtual network and services.

FIG. 13 is a flow diagram illustrating an exemplary process 1300 of using in-band communications for distributed virtual networks, according to an implementation described herein. Process 1300 may be implemented by one or more vNEs 110 in network environment 150. In another implementation, process 1300 may be implemented by vNE 110 in conjunction with multiple orchestrators 130 in network environment 150.

Referring to FIG. 13, process 1300 may include detecting a failed component (block 1305) and determining if the failed component is locally fixable (block 1310). For example, vNE 110 (e.g., a fault management agent 520 and a corresponding maintenance agent 560, 610, 710, etc.) may detect a failed component for a particular layer. vNE 110 (e.g., fix agent 510) may determine whether or not the failure can be resolved locally.

If the failed component is not locally fixable (block 1310—NO), process 1300 may include determining if the failed component is remotely fixable by a regional orchestrator (block 1315). For example, vNE 110 (e.g., connection layer maintenance agent 910) may provide a failure notification (e.g., using message format 1100) to regional orchestrator 130. The failure notification may include an indication that the failed component is not locally fixable, a suggested fixing entity, or an inconclusive diagnostic (e.g., in fix code 1155). Regional orchestrator 130 may receive the failure notification and determine if an automatic remote repair is possible.

If the failed component is not remotely fixable by the regional orchestrator (block 1315—NO), process 1300 may include determining if the failed component is remotely fixable by an orchestrator (block 1320). For example, regional orchestrator 130 (e.g., hierarchical management network diagnostic and trouble identification unit 1000) may determine that an automated remote fix at the regional level is not available for the corresponding failure notification. Regional orchestrator 130 may provide a failure notification message (e.g., using message format 1100 or another type of message) to a main orchestrator 130 for the distributed virtual network 150. The failure notification may include an indication that the failed component is not fixable by the regional orchestrator, a suggested fixing entity, and/or an inconclusive diagnostic (e.g., in fix code 1155). The main orchestrator 130 may receive the failure notification and determine if an automatic remote repair is possible.

If the failed component is not remotely fixable by the orchestrator (block 1320—NO), a repair time may be solicited from a field technician (block 1325), and a message with a fix time may be received and populated to other entities (block 1330). For example, the main orchestrator 130 may determine that an automated remote fix is not available for the corresponding failure notification. The main orchestrator 130 may provide another failure notification message (e.g., using message format 1100 or another type of message) to request technician input for a repair time. The technician may set a fix time and provide a message to the failed vNE 110 (e.g., connection layer maintenance agent 910) so that the vNE 110 can communicate the estimated repair time and other failure information to other layers and entities.

Returning to block 1320, if the failed component is remotely fixable by the orchestrator (block 1320—YES), process 1300 may include setting a fix time by the orchestrator and sending a message to the failed vNE layer (block 1335). For example, the main orchestrator 130 (e.g., hierarchical management network diagnostic and trouble identification unit 1000) may determine that an automated remote fix is available for the corresponding failure notification. The main orchestrator 130 may provide a failure notification message (e.g., using message format 1100 or another type of message) to indicate a repair time (e.g., in fix time 1160) for the failed component.

Returning to block 1315, if the failed component is remotely fixable by the regional orchestrator (block 1315—YES), process 1300 may include setting a fix time by the regional orchestrator and sending a message to the failed vNE layer (block 1340). For example, the regional orchestrator 130 may determine that an automated remote fix is available for the corresponding failure notification. The regional orchestrator 130 may provide a failure notification message (e.g., using message format 1100 or another type of message) to indicate a repair time (e.g., in fix time 1160) for the failed component.

After either of blocks 1335 or 1340, process 1300 may also include populating the message with the fix time to other layers (block 1350). For example, one of the layers of vNE 110 may receive the failure notification message from main orchestrator 130 or regional orchestrator 130 and may communicate the estimated repair time and other failure information to other layers and entities.

Returning to block 1310, if the failed component is locally fixable (block 1310—YES), process 1300 may include generating and sending a message with the estimated fix time to other layers, the orchestrator, technicians, and administrative systems (block 1350). For example, a layer of vNE 110 (e.g., fix agent 510) may determine the failure can be resolved locally and generate a failure notification message (e.g., using message format 1100 or another type of message) to indicate itself as the repair agent (e.g., in fix code 1155) and an estimated repair time (e.g., in fix time 1160). The failure notification may be populated, for example, to recipients designated in multicast address 1120.

Figure 14:
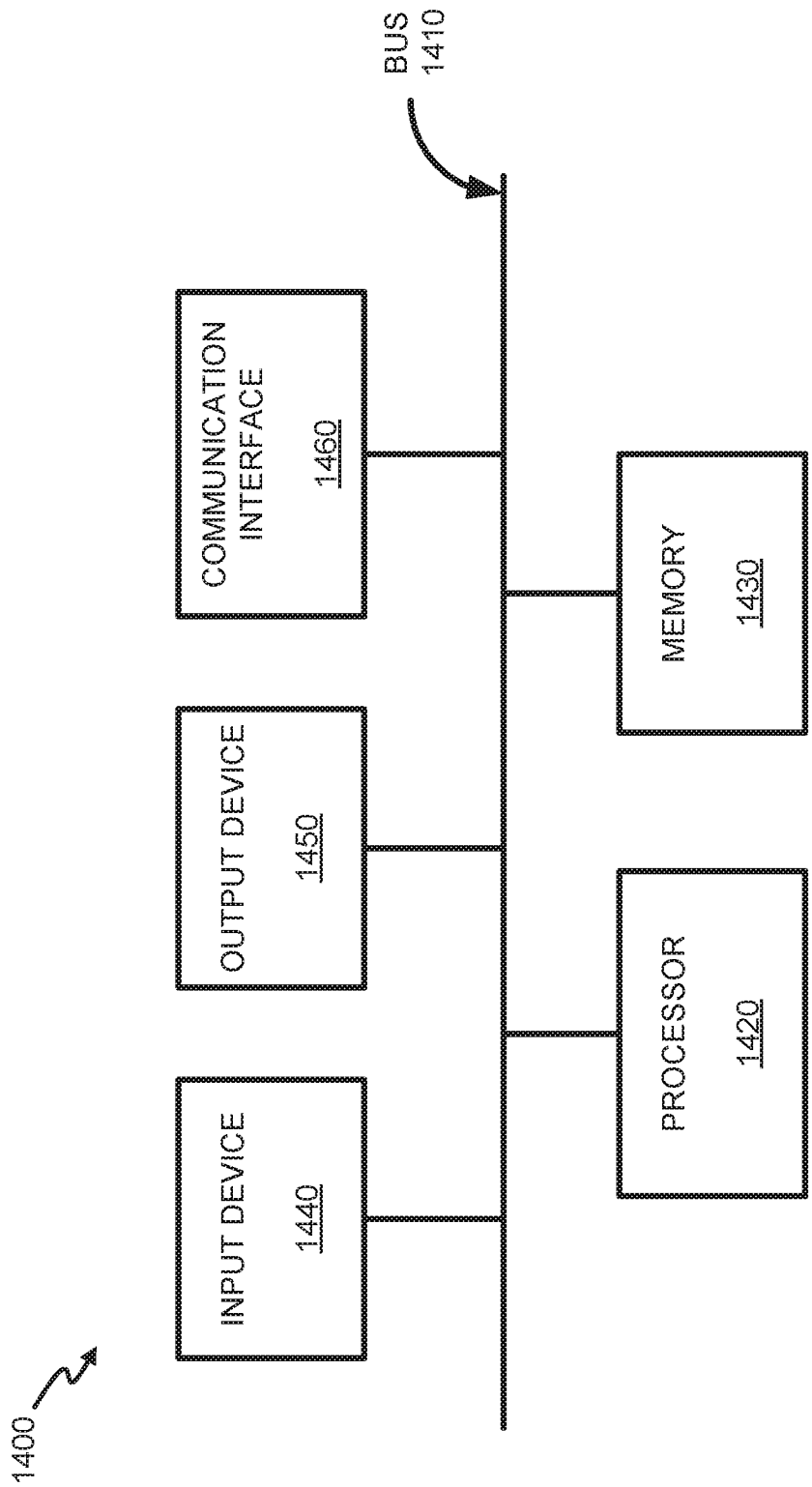
FIG. 14 is a diagram of exemplary components that may be included in one or more of the devices shown in FIGS. 1A and 1B.

FIG. 14 is a diagram illustrating example INF-L1 components of a device 1400 according to an implementation described herein. vNE 110, orchestrator 130, and virtual nodes in network 120 may each be implemented in one or more devices 1400. As shown in FIG. 14, device 1400 may include a bus 1410, a processor 1420, a memory 1430, an input device 1440, an output device 1450, and a communication interface 1460.

Bus 1410 may include a path that permits communication among the components of device 1400. Processor 1420 may include any type of single-core processor, multi-core processor, microprocessor, latch-based processor, and/or processing logic (or families of processors, microprocessors, and/or processing logics) that interprets and executes instructions. In other embodiments, processor 1420 may include an application-specific integrated circuit (ASIC), a field-programmable gate array (FPGA), and/or another type of integrated circuit or processing logic.

Memory 1430 may include any type of dynamic storage device that may store information and/or instructions, for execution by processor 1420, and/or any type of non-volatile storage device that may store information for use by processor 1420. For example, memory 1430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 1440 may allow an operator to input information into device 1400. Input device 1440 may include, for example, a keyboard, a mouse, a pen, a microphone, a remote control, an audio capture device, an image and/or video capture device, a touch-screen display, and/or another type of input device. In some embodiments, device 1400 may be managed remotely and may not include input device 1440. In other words, device 1400 may be "headless" and may not include a keyboard, for example.

Output device 1450 may output information to an operator of device 1400. Output device 1450 may include a display, a printer, a speaker, and/or another type of output device. For example, device 1400 may include a display, which may include a liquid-crystal display (LCD) for displaying content to the customer. In some embodiments, device 1400 may be managed remotely and may not include output device 1450. In other words, device 1400 may be "headless" and may not include a display, for example.

Communication interface 1460 may include a transceiver that enables device 1400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 1460 may include a transmitter that converts baseband signals to radio frequency (RF) signals and/or a receiver that converts RF signals to baseband signals. Communication interface 1460 may be coupled to an antenna for transmitting and receiving RF signals.

Communication interface 1460 may include a logical component that includes input and/or output ports, input and/or output systems, and/or other input and output components that facilitate the transmission of data to other devices. For example, communication interface 1460 may include a network interface card (e.g., Ethernet card) for wired communications and/or a wireless network interface (e.g., a Wi-Fi, LTE, etc.) card for wireless communications. Communication interface 1460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form, including logic that supports the generation, transmission and reception of messages in accordance with message format 1100.

As will be described above, device 1400 may perform certain operations relating to providing high-availability self-managed virtual network services. Device 1400 may perform these operations in response to processor 1420 executing software instructions contained in a computer-readable medium, such as memory 1430. A computer-readable medium may be defined as a non-transitory memory device. A memory device may be implemented within a single physical memory device or spread across multiple physical memory devices. The software instructions may be read into memory 1430 from another computer-readable medium or from another device. The software instructions contained in memory 1430 may cause processor 1420 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 14 shows exemplary components of device 1400, in other implementations, device 1400 may include fewer components, different components, additional components, or differently arranged components than depicted in FIG. 14. Additionally or alternatively, one or more components of device 1400 may perform one or more tasks described as being performed by one or more other components of device 1400.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 12 and 13, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
   one or more network devices in a network, the network devices comprising one or more memories and one or more processors for hosting virtual network elements for a self-managed virtualized system, each of the virtual network elements including:
      an infrastructure layer that automatically detects and repairs failures in hardware and an operating system for one of the virtual network elements;
      a virtualization layer that automatically detects and repairs failures in a hypervisor executing on the hardware and the operating system;
      a virtual machine layer that automatically detects and repairs failures in virtual machines managed by the hypervisor;
      a virtual network function layer that automatically detects and repairs failures in virtual network functions executed on the virtual machines;
      a connection layer that automatically detects and repairs failures in connections between the virtual network elements,
   wherein each of the infrastructure layer, the virtualization layer, the virtual machine layer, the virtual network function layer, and the connection layer include:
      a fix agent that uses artificial intelligence rules to automatically provide an estimated fix time interval for a local failure and repair the local failure in a corresponding layer of the infrastructure layer, the virtualization layer, the virtual machine layer, the virtual network function layer, or the connection layer if the failed component is locally fixable, and
      a fault management agent that diagnoses failures within the corresponding layer; and
   an orchestrator device, the orchestrator device including a processor to:
      receive failure notifications from the infrastructure layer, the virtualization layer, the virtual machine layer, the virtual network function layer, and the connection layer,
      automatically and remotely detect and repair failures that are not fixable by the infrastructure layer, the virtualization layer, the virtual machine layer, the virtual network function layer, and the connection layer, and
      provide another failure notification to indicate an estimated fix time interval for the failed component, wherein the estimated fix time interval is configured to be the summation of the time for failure identification and the time for switching from a failed entity to a healthy standby entity as recovery.

2. The system of claim 1, wherein each of the infrastructure layer, the virtualization layer, the virtual machine layer, the virtual network function layer, and the connection layer further include:
   a configuration and capacity management agent that manages capacities for the corresponding layer.

3. The system of claim 2, wherein each of the infrastructure layer, the virtualization layer, the virtual machine layer, the virtual network function layer, and the connection layer further include:
   a resource maintenance agent that monitors hardware resources within the corresponding layer to protect hardware resources during the failure.

4. The system of claim 3, wherein each of the infrastructure layer, the virtualization layer, the virtual machine layer, the virtual network function layer, and the connection layer further include:
   an analytics agent that collects historical data and provides data correlation for use by the fix agent and the fault management agent.

5. The system of claim 1, wherein each of the infrastructure layer, the virtualization layer, the virtual machine layer, the virtual network function layer, the connection layer, and the orchestrator device use a failure message in a common message format that includes a fix code indicating one of a layer or entity responsible for repairing the failure.

6. The system of claim 5, wherein each of the infrastructure layer, the virtualization layer, the virtual machine layer, the virtual network function layer, and the connection layer further include:
   a local maintenance agent to populate the failure message to other layers and management devices in the self-managed virtualized system.

7. The system of claim 6, wherein the common message format accommodates failure messages for a loss of signal (LOS), an alarm indication signal (AIS), a loss of frame (LOF), a remote defect indication (RDI), operating system issues, virtual network function issues, and hardware issues.

8. The system of claim 1, wherein each of the infrastructure layer, the virtualization layer, the virtual machine layer, the virtual network function layer, and the connection layer include a pair of maintenance entity group end points, one at each end of a layer boundary, for a particular service.

9. A system, comprising:
   a network interface to communicate with one or more remote systems;
   one or more memories to store instructions;
   one or more first processors configured to execute instructions in the one or more memories to host a virtual network element for a self-managed virtualized system, the virtual network element including:
      an infrastructure layer that automatically detects and repairs failures in hardware and an operating system for the virtual network element;
      a virtualization layer that automatically detects and repairs failures in a hypervisor executing on the hardware and the operating system;
      a virtual machine layer that automatically detects and repairs failures in virtual machines managed by the hypervisor;
      a virtual network function layer that automatically detects and repairs failures in virtual network functions executed on the virtual machines; and a connection layer that automatically detects and repairs failures in connections between the virtual network elements, wherein each of the infrastructure layer, the virtualization layer, the virtual machine layer, the virtual network function layer, and the connection layer include:

a fix agent that uses artificial intelligence rules to automatically provide an estimated fix time interval for a local failure and repair the local failure in a corresponding layer of the infrastructure layer, the virtualization layer, the virtual machine layer, the virtual network function layer, or the connection layer if the failed component is locally fixable, and a fault management agent that diagnoses failures within the corresponding layer; and one or more second processors configured to execute instructions in the one or more memories to:

receive failure notifications from the infrastructure layer, the virtualization layer, the virtual machine layer, the virtual network function layer, and the connection layer, automatically and remotely detect and repair failures that are not fixable by the infrastructure layer, the virtualization layer, the virtual machine layer, the virtual network function layer, and the connection layer, and provide another failure notification to indicate an estimated fix time interval for the failed component, wherein the estimated fix time interval is configured to be the summation of the time for failure identification and the time for switching from a failed entity to a healthy standby entity as recovery.

10. The system of claim 9, wherein each of the infrastructure layer, the virtualization layer, the virtual machine layer, the virtual network function layer, and the connection layer further include:

a configuration and capacity management agent that manages capacities for the corresponding layer.

11. The system of claim 9, wherein each of the infrastructure layer, the virtualization layer, the virtual machine layer, the virtual network function layer, and the connection layer further include:

a resource maintenance agent that monitors hardware resources within the corresponding layer to protect hardware resource during the failure.

12. The system of claim 9, wherein each of the infrastructure layer, the virtualization layer, the virtual machine layer, the virtual network function layer, and the connection layer further include:

an analytics agent that collects historical data and provide data correlation for use by the fix agent and fault management agent.

13. The system of claim 9, wherein each of the infrastructure layer, the virtualization layer, the virtual machine layer, the virtual network function layer, the connection layer, and the orchestrator device use a failure message in a common message format that includes a fix code indicating one of a layer or entity responsible for repairing the failure.

14. The system of claim 13, wherein each of the infrastructure layer, the virtualization layer, the virtual machine layer, the virtual network function layer, and the connection layer further include:

a local maintenance agent to populate a failure message to other layers and management devices in the self-managed virtualized system.

15. The system of claim 9, wherein the common message format accommodates failure messages for a loss of signal (LOS), an alarm indication signal (AIS), a loss of frame (LOF), a remote defect indication (RDI), operating system issues, and hardware issues.

16. A non-transitory computer-readable medium containing instructions executable by at least one processor, the computer-readable medium comprising one or more instructions to:

host a virtual network element for a self-managed virtualized system, the virtual network element including:

an infrastructure layer that automatically detects and repairs failures in hardware and an operating system for the virtual network element;

a virtualization layer that automatically detects and repairs failures in a hypervisor executing on the hardware and the operating system;

a virtual machine layer that automatically detects and repairs failures in virtual machines managed by the hypervisor;

a virtual network function layer that automatically detects and repairs failures in virtual network functions executed on the virtual machines; and a connection layer that automatically detects and repairs failures in connections between the virtual network elements, wherein each of the infrastructure layer, the virtualization layer, the virtual machine layer, the virtual network function layer, and the connection layer include:

a fix agent that uses artificial intelligence rules to automatically provide an estimated fix time interval for a local failure and repair the local failure in a corresponding layer of the infrastructure layer, the virtualization layer, the virtual machine layer, the virtual network function layer, or the connection layer if the failed component is locally fixable, and a fault management agent that diagnoses failures within the corresponding layer; and receive failure notifications from the infrastructure layer, the virtualization layer, the virtual machine layer, the virtual network function layer, and the connection layer;

automatically and remotely detect and repair failures that are not fixable by the infrastructure layer, the virtualization layer, the virtual machine layer, the virtual network function layer, and the connection layer; and provide another failure notification to indicate an estimated fix time interval for the failed component, wherein the estimated fix time interval is configured to be the summation of the time for failure identification and the time for switching from a failed entity to a healthy standby entity as recovery.

17. The non-transitory computer-readable medium of claim 16, wherein each of the infrastructure layer, the virtualization layer, the virtual machine layer, the virtual network function layer, and the connection layer include a pair of maintenance entity group end points, one at each end of a layer boundary, for a particular service.

18. The non-transitory computer-readable medium of claim 16, wherein each of the infrastructure layer, the virtualization layer, the virtual machine layer, the virtual network function layer, and the connection layer further include:

a local maintenance agent to populate a failure message to other layers and management devices in the self-managed virtualized system.

19. The non-transitory computer-readable medium of claim 18, wherein the local maintenance agent further requests assistance from an orchestrator device when the fix agent is unable to repair the local failure.

* * * * *